(12) United States Patent
Wendt et al.

(10) Patent No.: US 11,181,603 B2
(45) Date of Patent: Nov. 23, 2021

(54) BUILDING AUTOMATION SYSTEM

(71) Applicant: SIGNIFY HOLDING B.V., Eindhoven (NL)

(72) Inventors: Matthias Wendt, Würselen (DE); Harald Joseph Günther Radermacher, Aachen (DE); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 425 days.

(21) Appl. No.: 16/323,388

(22) PCT Filed: Jul. 24, 2017

(86) PCT No.: PCT/EP2017/068593
§ 371 (c)(1),
(2) Date: Feb. 5, 2019

(87) PCT Pub. No.: WO2018/024522
PCT Pub. Date: Feb. 8, 2018

(65) Prior Publication Data
US 2021/0278495 A1 Sep. 9, 2021

(30) Foreign Application Priority Data
Aug. 5, 2016 (EP) .................................... 16182988

(51) Int. Cl.
*H04W 24/00* (2009.01)
*G01S 1/68* (2006.01)
*G01S 1/02* (2010.01)

(52) U.S. Cl.
CPC ................ *G01S 1/68* (2013.01); *G01S 1/024* (2013.01); *G01S 1/026* (2013.01)

(58) Field of Classification Search
CPC . G01S 1/68; G01S 1/026; G01S 1/024; G01C 21/36; G01C 21/3647; G06Q 30/0251; G06Q 30/0266; A74G 2029/147
USPC ........................................................ 455/456.1
See application file for complete search history.

(56) References Cited

U.S. PATENT DOCUMENTS

| | | | | |
|---|---|---|---|---|
| 9,204,251 | B1 * | 12/2015 | Mendelson | G06Q 20/327 |
| 9,411,572 | B2 * | 8/2016 | Luk | H04W 4/02 |
| 9,456,311 | B2 * | 9/2016 | Ozkan | H04W 4/04 |
| 9,894,483 | B2 * | 2/2018 | Kokkonen | G06Q 30/0639 |
| 9,922,294 | B2 * | 3/2018 | Raina | H04L 63/107 |
| 9,936,342 | B2 * | 4/2018 | Huang | H04W 4/02 |

(Continued)

FOREIGN PATENT DOCUMENTS

| | | | | |
|---|---|---|---|---|
| EP | 1956311 A2 * | 8/2008 | | F24F 11/38 |
| EP | 2977782 A1 * | 1/2016 | | H04W 4/023 |

(Continued)

*Primary Examiner* — Mahendra R Patel

(57) ABSTRACT

An electronic building automation system, comprising one or more electronic building automation devices, comprising a beacon receiver arranged to receive localizing beacon signals transmitted from multiple beacons, a processor circuit configured to generate a service request comprising the beacon identifiers stored in the beacon identifier memory, the control computer arranged to generate a servicing message comprising data localizing the building automation device, said data being obtained from the beacon identifiers in the received service request.

13 Claims, 11 Drawing Sheets

(56) References Cited

U.S. PATENT DOCUMENTS

| | | | |
|---|---|---|---|
| 10,111,030 B2* | 10/2018 | Gedikian | H04L 65/4076 |
| 10,111,031 B2* | 10/2018 | Blowers | H04W 4/06 |
| 2004/0254725 A1* | 12/2004 | Douville | H05B 47/22 |
| | | | 701/469 |
| 2006/0074494 A1* | 4/2006 | McFarland | G05B 15/02 |
| | | | 700/1 |
| 2009/0102642 A1 | 4/2009 | Huseth et al. | |
| 2013/0141223 A1* | 6/2013 | Brandsma | G06K 7/01 |
| | | | 340/10.51 |
| 2014/0089111 A1* | 3/2014 | Fernandez | G06Q 30/0261 |
| | | | 705/15 |
| 2015/0039135 A1 | 2/2015 | Mori et al. | |
| 2015/0289207 A1* | 10/2015 | Kubo | H04W 4/80 |
| | | | 370/311 |
| 2015/0334548 A1* | 11/2015 | Liu | H04W 4/021 |
| | | | 370/329 |
| 2015/0373482 A1* | 12/2015 | Barnard | H04W 4/80 |
| | | | 370/338 |
| 2016/0042767 A1* | 2/2016 | Araya | H04N 7/188 |
| | | | 386/201 |
| 2016/0105773 A1* | 4/2016 | Wawrowski | H04W 4/08 |
| | | | 455/456.2 |
| 2016/0127875 A1* | 5/2016 | Zampini, II | G01S 5/00 |
| | | | 370/311 |
| 2016/0128105 A1* | 5/2016 | Dunsbergen | H04W 4/80 |
| | | | 370/329 |
| 2016/0140870 A1* | 5/2016 | Connor | G01N 21/255 |
| | | | 356/51 |
| 2016/0165570 A1* | 6/2016 | Kim | G01S 5/02 |
| | | | 455/456.2 |
| 2016/0189324 A1* | 6/2016 | Eramian | G06Q 10/02 |
| | | | 705/13 |
| 2016/0234649 A1* | 8/2016 | Finnerty | H04W 4/029 |
| 2016/0335686 A1* | 11/2016 | AthuluruTlrumala | |
| | | | H04N 21/44222 |
| 2016/0381621 A1* | 12/2016 | Kim | H04L 67/303 |
| | | | 370/329 |
| 2017/0278201 A1* | 9/2017 | Mimassi | G06Q 50/12 |
| 2017/0289749 A1* | 10/2017 | Brennan | H04W 40/244 |
| 2018/0211345 A1* | 7/2018 | Bean | H04W 84/18 |
| 2019/0007924 A1* | 1/2019 | Chen | G01S 5/02 |

FOREIGN PATENT DOCUMENTS

| | | |
|---|---|---|
| EP | 2977782 A1 | 1/2016 |
| EP | 1956311 B1 | 9/2017 |
| JP | 2004265774 A | 9/2004 |
| JP | 2009222417 A | 10/2009 |
| JP | 2015065177 A | 4/2015 |
| WO | 2016058808 A1 | 4/2016 |

* cited by examiner

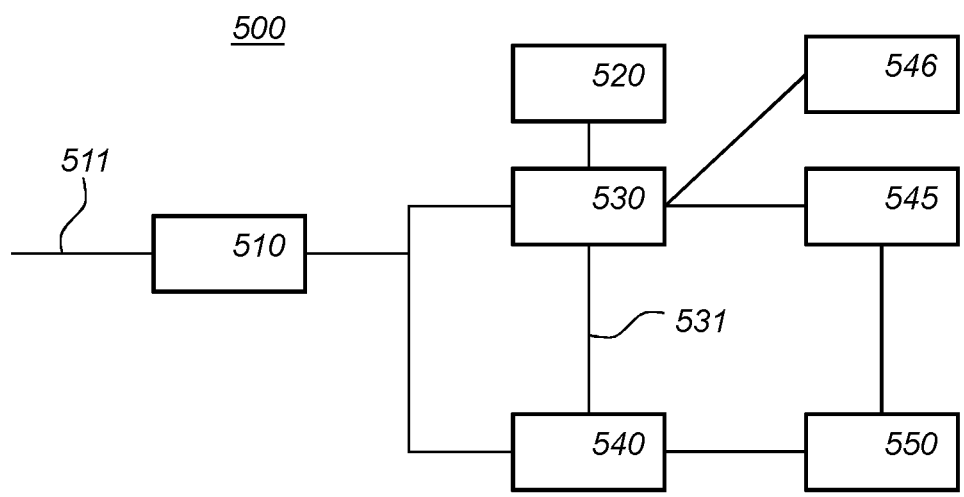

| Information about beacon reception ||||| 
| Lighting device || Est. distance in m || Distance category ||
| device | device class | Beacon B5 | Beacon C5 | Cat B5 | Cat C5 |
| --- | --- | --- | --- | --- | --- |
| S36701 | Flip Switch | 0,2 | 3,5 | immediate | far |
| L36701 | luminaire/Troffer2x | 0,3 | 3 | immediate | far |
| L36702 | luminaire/Troffer2x | 0,3 | 4 | immediate | far |
| S36702 | Flip Switch | 0,3 | 3,7 | immediate | far |
| L36453 | luminaire/Downligh | 1 | 3,5 | near | far |
| L36452 | luminaire/Downligh | 1,4 | 4,5 | near | far |
| L36454 | luminaire/Downligh | 1,6 | 2,5 | near | far |
| L36703 | luminaire/Troffer2x | 1,9 | 3,5 | near | far |
| L36704 | luminaire/Troffer2x | 2 | 4,4 | near | far |
| L36602 | luminaire/Troffer2x | 2,2 | 1,4 | far | near |
| L36455 | luminaire/Downligh | 2,5 | 1,7 | far | near |
| S36602 | Flip Switch | 2,5 | 1,1 | far | near |
| S36601 | Flip Switch | 2,6 | 0,9 | far | near |
| L36604 | luminaire/Troffer2x | 2,8 | 2,3 | far | far |
| L36601 | luminaire/Troffer2x | 3,2 | 0,5 | far | immediate |
| P36601 | Presence detector | 3,2 | 1,4 | far | near |
| L36456 | luminaire/Downligh | 3,6 | 1 | far | near |
| L36603 | luminaire/Troffer2x | 3,7 | 1,9 | far | near |
| S36404 | Flip Switch | 4 | 1,8 | far | near |

BUILDING AUTOMATION SYSTEM

CROSS-REFERENCE TO PRIOR APPLICATIONS

This application is the U.S. National Phase application under 35 U.S.C. § 371 of International Application No. PCT/EP2017/068593, filed on Jul. 24, 2017, which claims the benefit of European Patent Application No. 16182988.2, filed on Aug. 5, 2016. These applications are hereby incorporated by reference herein.

FIELD OF THE INVENTION

The invention relates to a building automation system, a building automation device, a control computer, a servicing device, a building automation method, a mobile servicing method, a control method, and a computer readable medium.

BACKGROUND

In modern lighting systems the number of devices is growing. This is because of the wish for fine grained lighting but also because LED based lamps can be made efficient even in ever smaller form factors and small lumen packets. At the same time, the reliability of LED networks is increasing. Because of this servicing of such networks is hard: In modern buildings there will be a large number of lamps that rarely fail. For this reason, it is relatively expensive to service such lighting systems by hand. Service personal would have to verify a large number of lamps to find relatively few failures.

With an increasing number of smaller lamps just locating a failed device becomes hard. Due to reorganizations, the room organization present when a network was implemented need not be the same as the present organization. In fact, modern buildings are often optimized for easy reorganizations, e.g., changing offices to open plans, or vice versa. Also lighting plans may be incorrect.

Even the network used in a connected lighting system does not always give accurate clues as to the location of a lighting asset. Even if the lighting system is wired, e.g., using power over Ethernet technology, the routing of the network does not always give a good indication of the light network asset's location. Two elements that are close in the network, need not be close in physical distance. Even if two lamps are connected to the same switch they do not need to be near to each other. The latter happens in practise because switches are relatively expensive element in a connected lighting system, so that they tend to be used to capacity.

The inventors have found that in practice finding failed devices is a problem that needs to be addressed. The same problem occurs not only in connected lighting systems, but more generally in the field of building automation. In building automation, multiple devices are connected through a digital network to control computer. The control computer manages the building automation system. Building automation includes heat, ventilation, air conditioning (HVAC), lighting, security, etc.

SUMMARY OF THE INVENTION

An electronic building automation system is defined in the claims addressing these and other problems as set out herein. The building automation system comprises one or more electronic building automation devices and a control computer. The system may be serviced by a mobile servicing device.

Because the building automation device comprises a beacon receiver it can keep track of the beacons that it can receive, and possibly also the reception strength of those beacons. If the building automation device needs servicing, it includes this information in a service request. The information on beacon reception coupled to known location of the beacons allows the location of broken building automation devices to be estimated. In an embodiment, a mobile servicing device is guided to the broken building automation device using the beacons.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a building automation system, FIG. 1b schematically shows an example of an embodiment of a building automation system, FIG. 2a schematically shows an example of an embodiment of an office light plan FIG. 2b schematically shows a detail of FIG. 2a.

FIG. 3 schematically shows an example of an embodiment of a library in a perspective view, FIG. 4a schematically shows a detail of FIG. 2a.

Figure 1A:
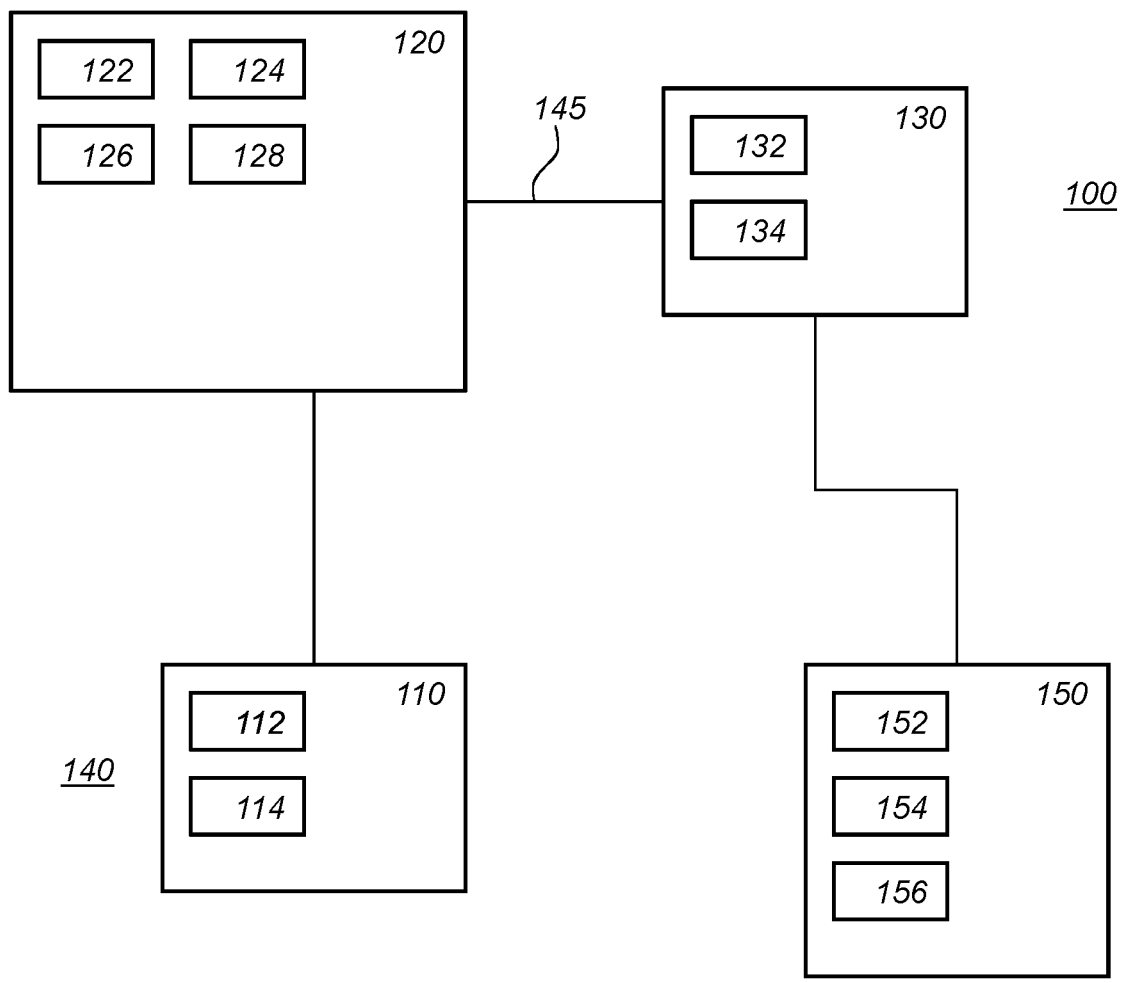
Figure 1B:
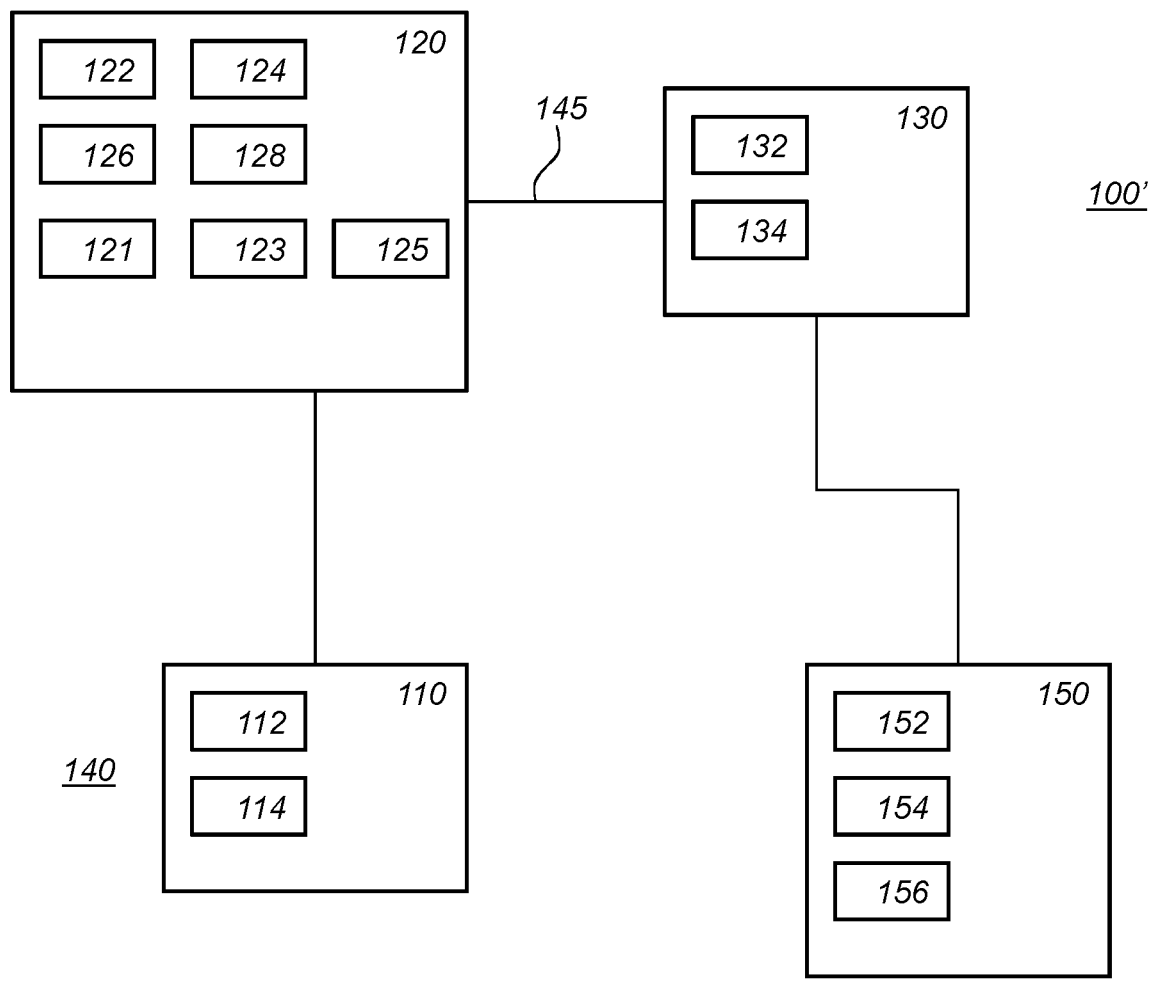

FIG. 5 schematically shows an example of an embodiment of a luminaire and LED,

LIST OF REFERENCE NUMERALS IN FIGS. 1a, 1b AND 5

100, 100' a building automation system
110 a beacon
112 a radio circuit
114 a beacon memory
120 an electronic building automation device
122 a communication interface
124 a beacon receiver
126 a beacon identifier memory
128 a processor circuit
121 a current measuring unit
123 a voltage measuring unit
125 a counter
130 a control computer
132 a communication interface
134 a processor circuit
140 a localization system
145 a digital network
150 Mobile servicing device
152 a communication interface
154 a beacon receiver
156 a processor circuit
500 a luminaire
510 a powered device circuit (PD)
511 a power over Ethernet connection
520 a memory
530 a processor circuit
531 control connection
540 a driver
545 a measurement unit
546 a beacon receiver
550 a LED

DETAILED DESCRIPTION OF PREFERRED EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1a schematically shows an example of an embodiment of an electronic building automation system 100. System 100 comprises multiple electronic building automation devices. One building automation device 120 is shown. System 100 further comprises a control computer 130. Control computer 130 and the building automation device are connected via a digital network. Control computer 130 controls the building automation devices.

FIG. 1a further shows a localization system 140. Localization system 140 comprises multiple beacons. One beacon 110 is shown, the other beacons follow the same or a similar design. For example, the beacons may be distributed around a building.

Beacon 110 comprises a beacon memory 114. Beacon memory 114 is arranged to store a beacon identifier. In an embodiment, the beacon identifier is unique for localization system 140. Beacon 110 comprises a radio circuit 112. Radio circuit 112 is arranged to transmit a wireless localizing beacon signal. The wireless localizing beacon signal comprises the beacon identifier stored in beacon memory 112. Beacon 110 is arranged to periodically repeat the localization signal. Beacon 110 may comprise a processor circuit configured to generate the localization signal and to periodically repeat transmission of the localization signal over radio circuit 112. Radio circuit 112 may comprise an antenna.

Beacon based localization system 140 allows a device with a beacon receiver, e.g., a mobile phone, to obtain its position on a small scale. Beacon based localization system 140 is in particular suited where GPS reception is poor, e.g., indoors. The indoor location may be used, e.g., to deliver contextual content to users based on location. For example, information what is at a specific location may be obtained separately as a wireless service as requested by a mobile app. A localization system may be the backbone for many location-based services.

Beacons may be based on different types of wireless technology. For example, beacons 110 may be a Bluetooth, Zig-Bee, or Wi-Fi beacon. In an embodiment, beacon 110 uses Bluetooth Low Energy. Other possible beacon types include BLE, WiFi, WiMax, cellular triangulation or LoRa (e.g. for street lighting). The received beacons may be a mixture of different type beacons.

Beacons typically operate alone and may be battery powered which means they have to be serviced every couple of years. Typically, beacons are not part of a network, and are not able to send push-messages to receiving devices. Neither are beacons equipped for collecting user data or for storing these. In an embodiment, a beacon solely sends information about its identity. The beacon identifier distinguishes the beacons in localization system 140 from each other.

Often beacons are installed in a grid to give good location coverage over the whole space. Advantageously, beacons are placed in the ceiling. With this placement they are located with a good line of sight which is beneficial for reception coverage.

In further developed embodiments, beacon receivers are positioned at different heights to obtain increased resolution. Beacon receivers at different heights may be used to localize a beacon receiver in three dimensions. In a yet further developed embodiment, a beacon receiver comprises a directive antenna. A directive antenna allows determining a direction from which a beacon signal came. Having a direction in addition to a signal strength allows obtaining a more accurate position.

In an embodiment, a localization signal comprises a constant preamble followed by the beacon identifier. The beacon identifier may be a UUID (Universally Unique Identifier), and a Major and Minor value. For example, the UUID may be 16 bytes long, Major and Minor are each 2 bytes long. Together these form an ID for the beacon. In an embodiment, the UUID is the same for all beacons in the same localization system 140, while the Major and Minor values vary for each beacon. A localization signal may further comprise a signal power value. For example, it may represent the RSSI value (Received Signal Strength Indication) measured at 1 meter from the beacon. The value of this value may be used in calculating a location from received signal strengths. The signal power value of the beacon may be known at the control computer. For example, the control computer may comprise a table associating beacon identifier to signal power value. The signal power value may be the same for all beacons in localization network 140.

The range of the localization signal of a beacon depends on the transmission power of the beacon. This may be the same for all beacons, or may be set differently for some beacons. Note that reception of a beacon localization signal depends on environmental factors. The localization signal is repeated each time period. The time period may be set smaller if frequent updates in localization are needed, e.g., if the localized object moves quickly. More frequent repeats of the localization signal use more power. For example, a repeat interval may be set between, e.g., 100 ms and 1 second, e.g., 200 ms.

Building automation device 120 comprises a communication interface 122 arranged to communicate with control computer 130 over a digital network 145. Digital network 145 may comprise a wired network, e.g., an Ethernet network, e.g. using one or more power over Ethernet connections (PoE). Digital network 145 may comprise a wireless network, e.g., a Wi-Fi or ZigBee network. Digital network 145 may combine wired and wireless technologies.

Building automation device 120 comprises a beacon receiver 124 arranged to receive localizing beacon signals transmitted from multiple beacons installed in the vicinity of the building automation device. From the received localizing beacon signals an estimate of the location of building automation device 120 may be computed. It is not necessary that all building automation devices in building automation system 100 comprise a beacon receiver 124.

Computing a location from received localizing beacon signals may be done in a variety of ways. For example, in a simple embodiment, one may simply conclude that the building automation device 120 is not too far removed from the beacons that it can receive, e.g., it is within range. In a more advanced embodiment, the intersection of the ranges of the received beacons may be determined, and it can be concluded that building automation device 120 is located in or near the intersection. Building automation device 120 comprises a beacon identifier memory 126 for storing beacon identifiers received by the beacon receiver in a time period. For example, device 120 may comprise a processor circuit configured for storing a received beacon identifier in beacon identifier memory 126.

In an embodiment, the beacon identifiers that are received in the localization signals are stored in the beacon identifier memory 126. In an embodiment, beacon identifier memory 126 is last in last out, e.g., a queue. For example, the beacon identifier memory 126 may be sized to store the last 100 beacon identifiers. In a smaller embodiment, beacon identifier memory 126 may keep only the last 4 beacon identifiers. In a more advanced embodiment, processor circuit 128 is configured to store for each received beacon identifier the time at which it was last received. In an embodiment, the time period for which information on beacon identifiers is kept may be limited to a specific value, e.g., to a few seconds, a minute, etc. For example, the latter may be implemented by discarding all beacon identifiers that were received more than the time interval ago.

In an embodiment, device 120 does not receive or process the localization signals continuously, e.g., to reduce power use, or bandwidth, or to reduce complexity. For example, device 120 may be configured to store beacon identifier only during a time interval of a specific length, e.g., a minute, a second, etc. This may be repeated, say, once or a few times a day.

Better estimates of location can be made by recording the received signal strength of the localization signal. In an embodiment, beacon receiver 124 is arranged to measure the signal strength of the localization signal. Processor circuit 128 is arranged to store a signal strength indication with the beacon identifiers in the beacon identifier memory. The signal strength indication indicates the signal strength with which the localization signal was received at beacon receiver 124. Optionally, processor circuit 128 is arranged to also store a signal power value received in the localization signal. The signal power value may be used with the signal strength indication in estimating a distance between the beacon receiver 124 and the beacon. The signal power value may also be used to verify that the settings of the beacons have not changed without authorization. The signal strength indication and optionally the signal power value may be communicated to control computer 130.

In an embodiment, a beacon receiver may be arranged to report a signal strength indication, e.g., RSSI. From the signal strength indication an estimated distance to the beacon may be computed. In an embodiment, the estimated distance may be rounded to a small number of categories, e.g., unknown, immediate below 50 cm, near up to 2 m and far up to 30 m.

Processor circuit 128 is arranged to generate a message comprising beacon identifiers stored in the beacon identifier memory, and to transmit the message to control computer 130 over the digital network. The message may also include a signal strength indication, e.g., for each received beacon identifier. The received signal strength indication may, e.g., be expressed in decibels. For example, control computer 130 may comprise a communication interface 132 arranged to communicate with the building automation devices 120 over digital network 145. Control computer 130 comprises a processor circuit 134 configured to process the received messages.

From the information on the received beacon identifier, and possibly the signal strength indication, and known locations of the beacons, a location of the beacon receiver can be estimated using various algorithms known in the art. For example, a trilateral estimation may be used, comprising estimated the distance between the beacon receiver and at least 3 beacons using the received signal strength. An example is given in the paper "Algorithms for Location Estimation Based on RSSI Sampling", by Papamanthou et al.

In an embodiment, building automation device 120 is a luminaire. In an embodiment, building automation device 120 is any one of the following group: a heating device, a ventilation device, an air conditioning device, a speaker, an automated air valve, a fire detector, a sensor, a wall switch. For example, the control computer may a back-end of a building automation system (BAS) or building management system (BMS).

Figure 2A:
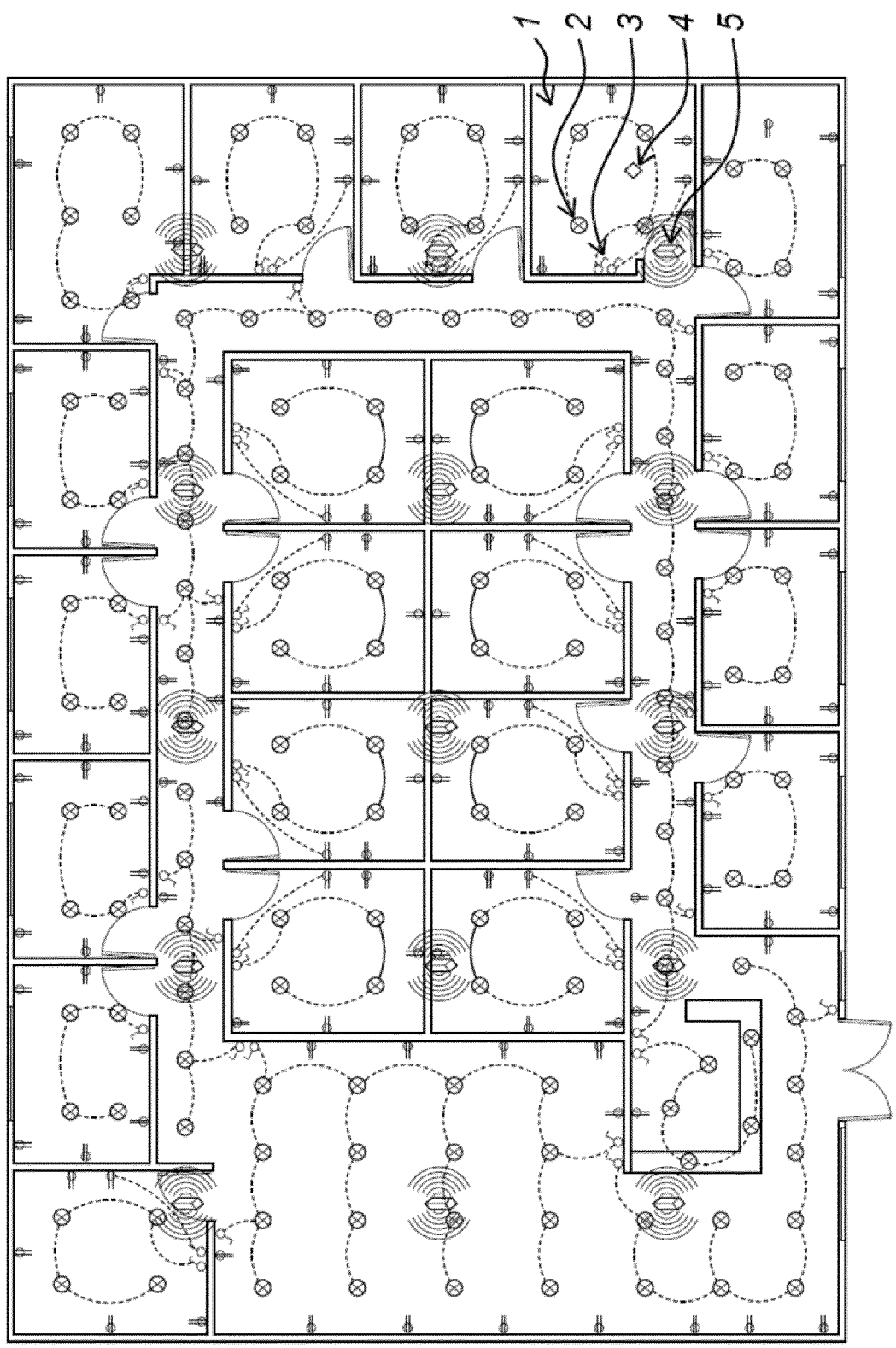
Figure 2B:
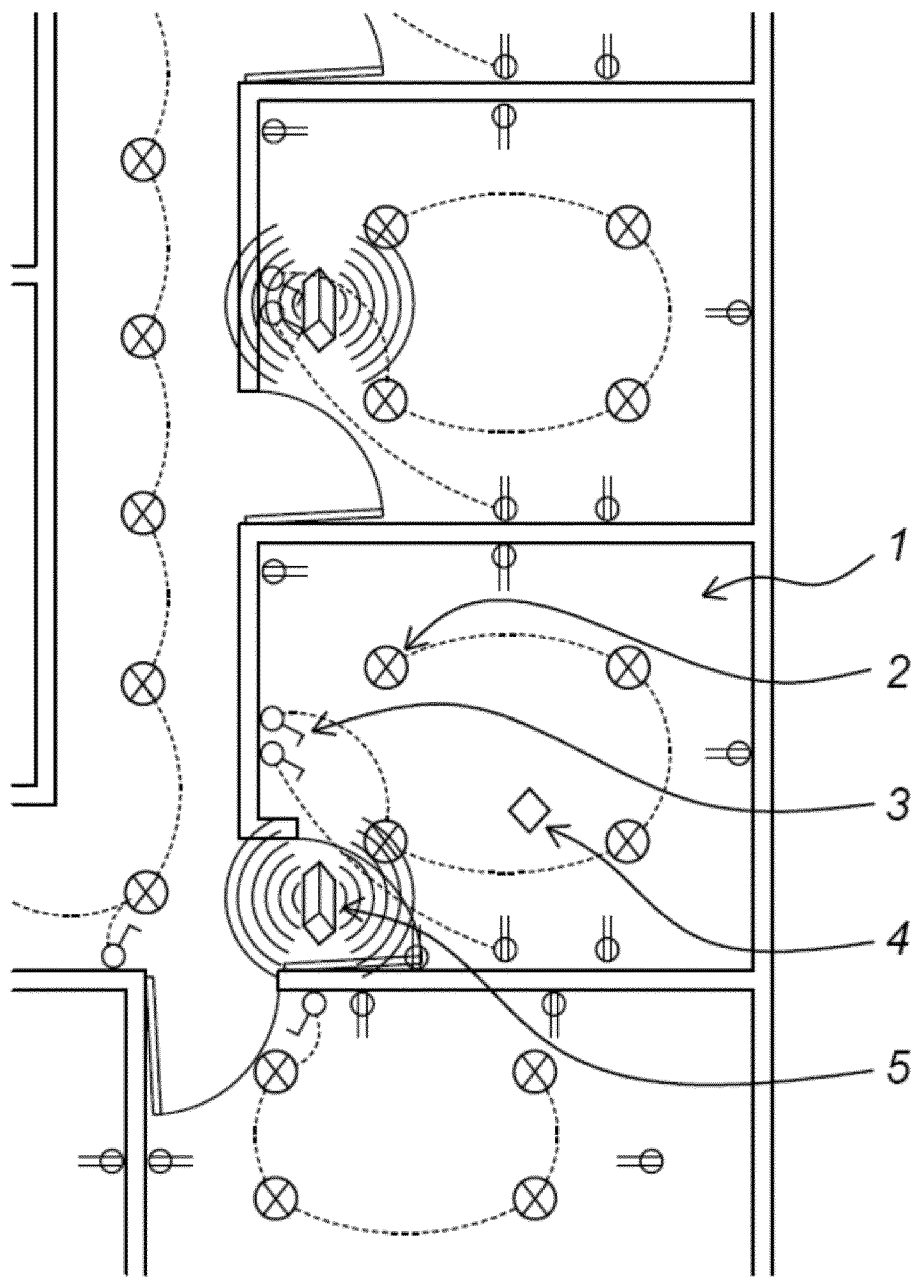

FIG. 2a schematically shows an example of an embodiment of an office light plan. FIG. 2b schematically shows a detail of FIG. 2a. A connected lighting system is an example of a building automation system. Shown in FIGS. 2a and 2b are beacons 5, arranged in a grid. For example, the lighting plan shown in FIG. 2a may be an office space comprising a number of office rooms 1. In the office room 1, a group of lamps 2 are controlled by manual switches 3 and/or sensors 4. In embodiment, one or more of the assets like sensors 4, manual controls 3 and light sources 2 comprise a beacon receiver as shown in FIG. 1a. The connected lighting system of FIG. 2a comprises a control computer, which is not shown in FIG. 2a.

In an embodiment, sensor 4 is an occupancy sensor arranged to determine occupancy of an area surrounding the occupancy sensor. For example, the occupancy sensor may be an infrared sensor, or a movement sensor, etc. For example, the occupancy sensor is arranged to generate an occupancy signal if the occupancy sensor detects occupancy or no occupancy of an area surrounding the occupancy sensor. The occupancy signal may be used to control the luminaires 2. This may be done directly, e.g., by a local network of a local network, or via the control computer. For example, processor circuit 134 of control computer 130 may be configured to determine from one or more occupancy sensors an occupancy status of an area surrounding the luminaire 2, e.g., office 1. If control computer 130 determines that office 1 is occupied, then control computer may send a control message to the luminaires 2 to switch them on. Possibly, the decision to turn a luminaire on may be more complicated and also involve day light sensors, and (wall) switches or other local controls, etc.

Figure 3:
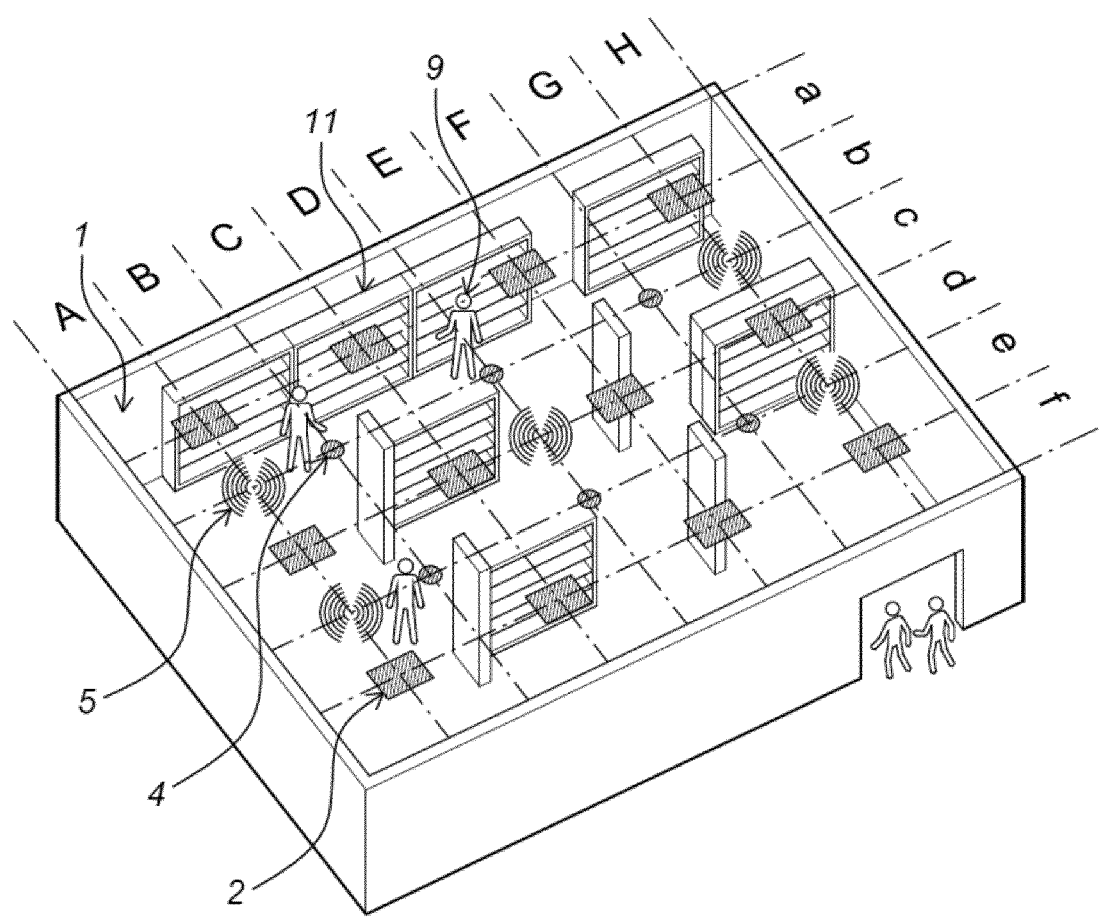

FIG. 3 schematically shows an example of an embodiment of a library in a perspective view. Here beacon technology is used to support people searching for specific books by means of multiple beacons 5 installed in the ceiling distributed over the space. FIG. 3 shows a room 1 with a grid of light sources 2 in the ceiling and five beacons 5. People 9 are moving around and are supported to reach a shelf 11 where a certain book is located. For example, a mobile phone of people 9 may comprise a beacon receiver to determine a location in the library. Using the location of the mobile phone a signal may be computed to guide the people in the correct direction. For example, the signal could be a map in which the desired location and the current location of the mobile phone are indicated. Similar applications are in shops, storing spaces or magazines.

Figure 4A:
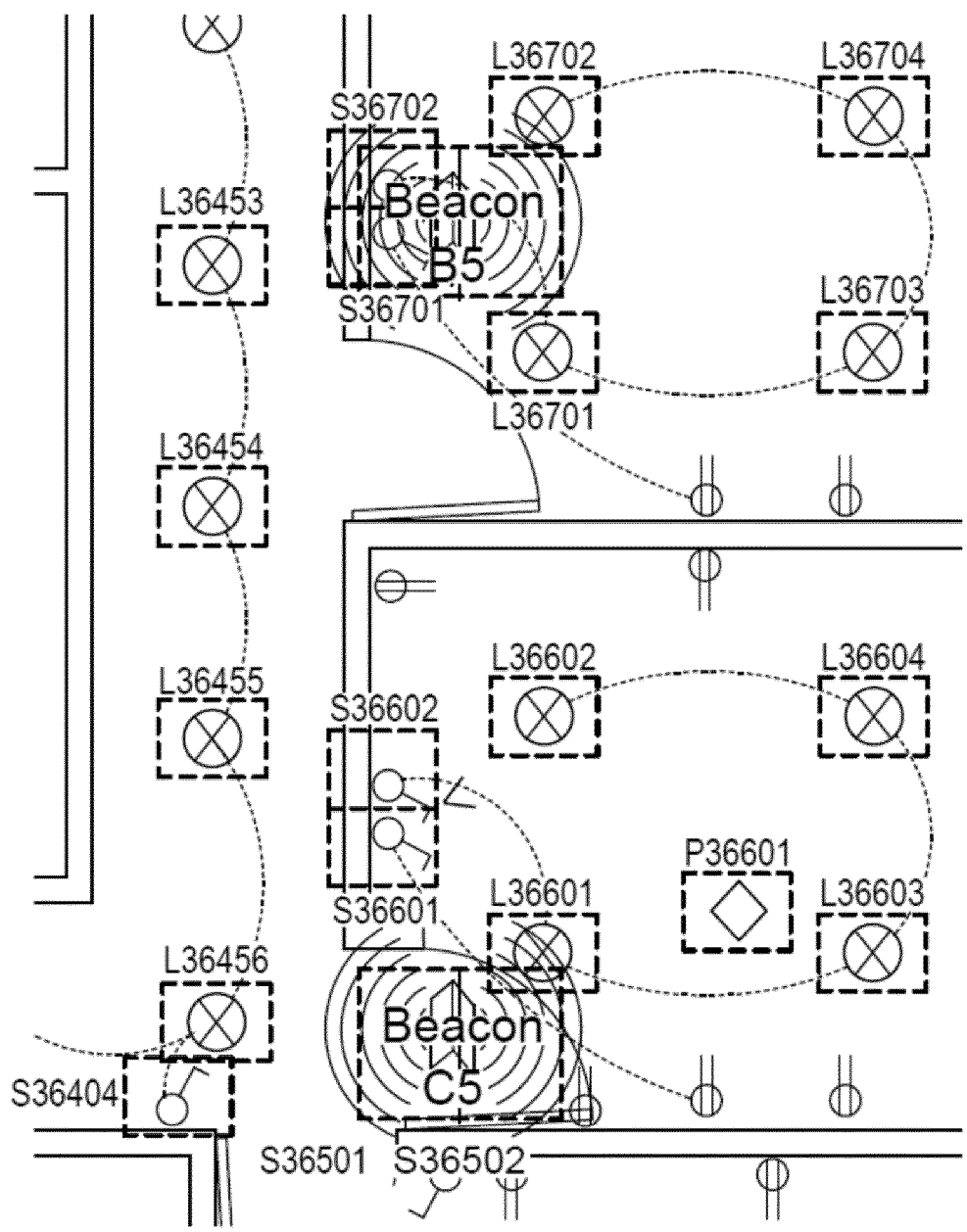
FIG. 4b schematically shows an example of an embodiment of a beacon reception report.

FIG. 4a schematically shows a detail of FIG. 2a. Shown in FIG. 4a are identifier of the assets in the building automation system, in this case a connected lighting system. Also shown are two beacons: B5 and C5. The assets are configured to send a message to control computer 130 with the received beacon identifiers and the corresponding signal strength indications. FIG. 4b schematically shows an example of an embodiment of a beacon reception report. Shown in FIG. 4b is a table with 6 columns: the identifier of the device in the lighting system, a device class, e.g., a device type, device model, etc., estimated distances to beacons B5 and C5, and estimated distance categories to beacons B5 and C5. The estimated distance to a beacon is often subject to a lot of noise, e.g., due to environment interference. In some applications the distance category is about as accurate as the estimate distance. For example, presence detector (occupancy sensor) P36601 is far from beacon B5 but close to beacon C5.

In modern lighting systems the number of devices is growing. This is because of the wish for fine grained lighting but also as LED based lamps can be made efficient even in small form factors and small lumen packets. In some cases, multiple radios may be present in the same luminaire. For example, one luminaire equipped with four Smart LED lamps having each a wireless radio. In addition, part of these assets are hard to physically locate. This is e.g. the case in PoE lighting systems where the power sourcing equipment (PSE) is located behind the suspended ceiling. This all leads to a growing issue directing service personal to the right spot when devices need maintenance, repair or exchange. The LEDs may be so-called TLEDs.

In an embodiment, lighting assets (or other building automation device, e.g., such as connected infrastructure devices like speakers, air valves, fire detectors etc.) are able to receive beacons. These register the beacons and when needing service, they transmit the registered beacon identifiers to the central lighting (or building) management system. The information about all receivable beacons and the relative RF amplitude gives a good indication of the position of that very asset. A service call may contain the related beacon identifiers and allow the service personal to find their way to the related lighting device. Before climbing the ladder, the received beacon identifiers can be verified using the mobile servicing device.

Returning to FIG. 1a. Processor circuit 128 is configured to monitor building automation device 120 and determine a need for servicing of the building automation device. There are multiple ways in which a processor may monitor a device. A number of different examples are shown in FIG. 1b, and discussed below. Other ways to monitor a device known in the art may also be applied. FIG. 1b shows a building automation device 100' that is based on the embodiments of FIG. 1a but includes additional optional elements.

In an embodiment, building automation device 120 comprises a current measuring unit 121. Current measuring unit 121 is arranged to determine electric current flowing through a component of the building automation device. For example, the current flowing through a LED.

Processor 128 of the building automation device 120 is configured to determine a need for servicing when the building automation device is in an on-state and current measured by the current measuring unit is below a threshold. In particular, if no current flows, the LED is likely broken.

In an embodiment, building automation device 120 comprises a voltage measuring unit 123 arranged to determine electric voltage across a component of the building automation device. For example, the voltage across a LED. Processor 128 of the building automation device 120 is configured to determine a need for servicing when the building automation device is in an on-state and a voltage measured by the voltage measuring unit is above a threshold. When no voltage differential exists on a LED, even though it should be giving light, it is likely broken.

The voltage and current measurement may be done over other components than LEDs. For example, over a motor in an air-conditioning device, etc.

In an embodiment, building automation device 120 comprises a counter 125. Processor 128 of the building automation device 120 is configured to increase the counter in dependence on the use of the building automation device, and determine a need for servicing when the counter reaches a threshold. For example, each time the building automation device 120 is turned on, the counter may be increased. For example, for each time period, say each 5 minutes, that building automation device 120 is turned on, the counter may be increased. For example, processor 128 may be configured to obtain an intensity of use of the building automation device, say a dimming level in case of a luminaire, and increase the counter in dependence on the intensity of use of the building automation device. Processor 128 is configured to determine a need for servicing when the counter reaches a threshold. For example, the counter may be set to a neutral value upon manufacture, the neutral value may be 0.

In another embodiment the building automation device may also indicate a corrupt firmware image, or the need for a firmware upgrade. In some embodiment, updating of the firmware is not possible over the lighting control network but requires 1:1 uploading.

In an embodiment, building automation device comprises none, or one, or multiple of current measuring device 121, voltage measuring device 123 and counter 125.

FIG. 5 schematically shows an example of an embodiment of building automation device, in this case a luminaire 500 in which a LED 550 is installed Luminaire 500 is an example of a building automation device.

Luminaire 500 comprise a powered device circuit 510. Powered device circuit 510 is arranged for Power over Ethernet. Powered device circuit 510 obtains electric power to drive luminaire 500 from a power over Ethernet connection 511. Powered device circuitry 510 is further arranged to provide access to a digital network, that connects luminaire 500 to a control computer. For example, a powered device (PD) may be interface circuitry to connect a client, in this case a luminaire, to a PoE PSE.

Luminaire 500 comprises a driver 540 driving a LED 550. Processor 530 controls driver 540 through a control connection 531. For example, processor 530 turns the LED on or off in dependence upon control signal received from control computer 130.

Luminaire 500 comprises a memory 520 and a processor circuit 530. Processor circuit 530 executes computer instructions stored in memory 520. Memory 520 may also be used as beacon memory.

Luminaire 500 comprises a measurement unit 546 arranged to monitor luminaire 500. For example, measurement unit 545 may be current monitor, voltage monitor or counter as described above. Luminaire 500 comprises a beacon receiver 546.

If measurement unit 545 detects that LED 550 operates outside of predefined operating thresholds, then processor circuit 530 generates a service request comprising beacon identifiers obtained from beacon receiver 546 and sends it to a control computer through powered device network connection 510.

Returning to FIG. 1*a*. Once processor 128 determined that there is a need for servicing, for example, because a component is broken or because the performance of a component appears to be reducing, then processor 128 generates a service request and transmits the service request to control computer 130 over digital network 145. The service request is a digital message and may include information regarding the need for servicing, e.g., the current, voltage or counter values obtained. The service request may include an identifier of the asset. However, even with knowledge of the asset identifier it may still be hard to actually locate the identifier in a building.

The service request includes the beacon identifiers stored in the beacon identifier memory 126. For example, the beacon identifiers received in the past time period, say a minute, or a last number of beacon identifiers, say the last 100, or a last number of unique beacon ids, say the last 10 unique beacons ids, etc.

Control computer 130 comprises a communication interface 132 arranged to receive the service request comprising the beacon identifiers from building automation device 120. Processor circuit 134 is arranged to generate a servicing message comprising data localizing the building automation device, said data being obtained from the beacon identifiers in the received service request.

In an embodiment, processor circuit 134 estimates the location of the building automation device from which the service request originated, say device 120. For example, control computer 130 may store a list of locations of the beacons, e.g. with location coordinates. Using the beacon information in the service request the location of device 120 may be estimated. For example, the service request may comprise beacon identifiers and corresponding RSSIs. The data localizing the building automation device may be an estimated location of the broken building automation device. For example, the servicing message may be a report comprising the locations of one or more building automation device that requested service. The report may be transmitted to service personal, e.g., over email. The report may be send to a printer.

In an embodiment, the processor circuit is configured to transmit the servicing message to an optional mobile servicing device 150. The data localizing the building automation device may be the estimated locations of the one or more building automation device that requested service. The data localizing the building automation device may instead (or in addition) comprise the original beacon information received the building automation device (or part thereof). In the latter case, localizing may be done later.

Mobile servicing device 150 comprises a communication interface 152 arranged to communicate with control computer 130 over a digital network. The latter may be a different digital network than digital network 145. For example, the mobile servicing device 150 and control computer 130 may communicate over the Internet, say (partially) over a Wi-Fi network. Mobile servicing device 150 receives the servicing message comprising the data localizing the building automation device from control computer 130 through a communication interface 152.

Mobile servicing device 150 comprises a beacon receiver 154 arranged to receive localizing beacon signals transmitted from multiple beacons installed in the vicinity of the one or more building automation devices.

Mobile servicing device 150 comprise a processor circuit 154 configured to obtain a localization of the building automation device 120 from the data localizing the building automation device in the servicing message relative to a current position of the servicing device using the beacon receiver of the servicing device. For example, mobile servicing device 150 may display a map on which the present location of servicing device 150 is shown, as well as the destination—the broken building automation device. For example, the data localizing the building automation device may comprise a location of the building automation device, as estimated by the control computer. Mobile servicing device may estimate the location of the building automation itself.

Figure 6A:
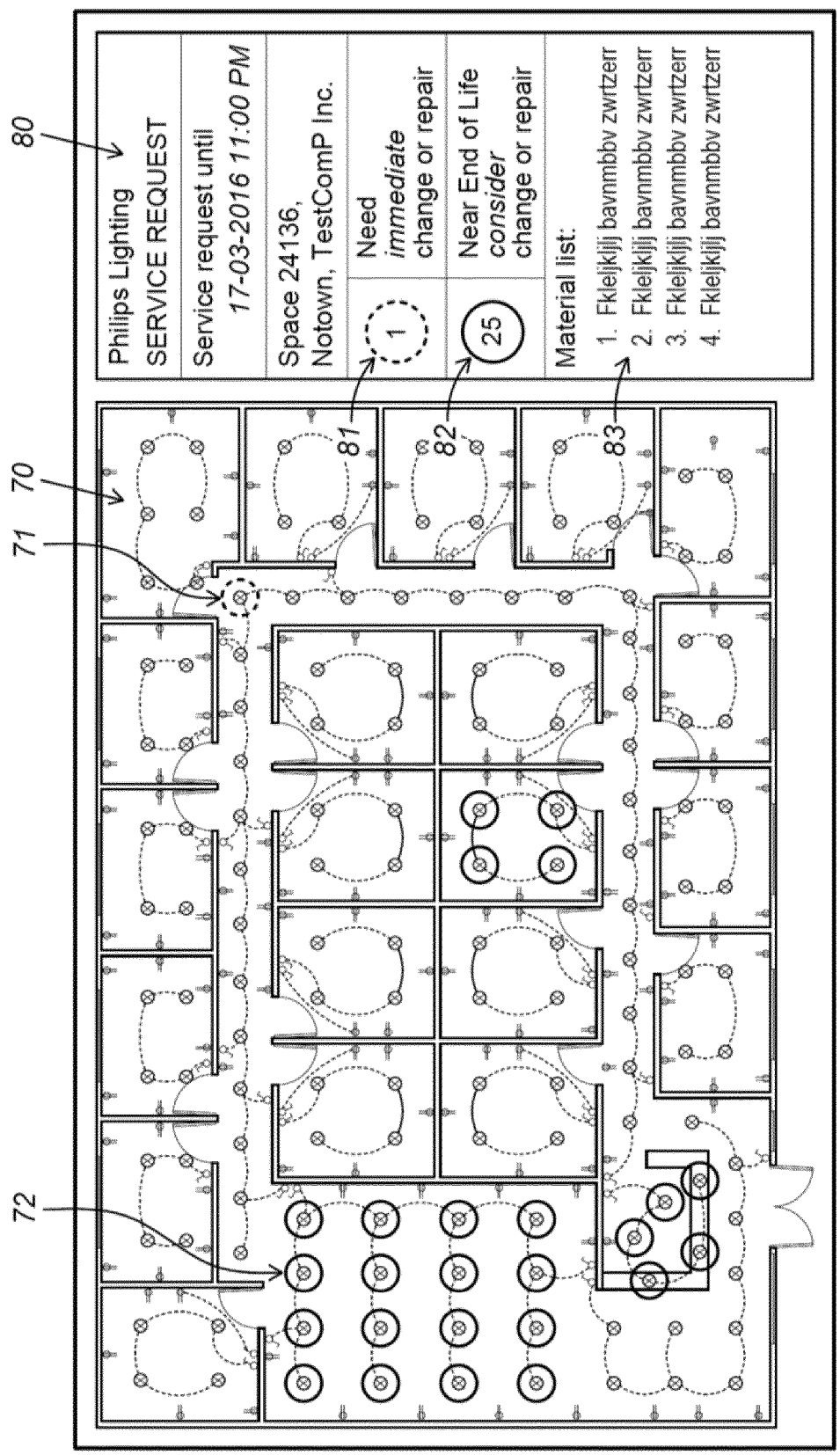
FIG. 6a schematically shows an example of a display of a servicing message.

FIG. 6*a* shows an example display that may be generated by mobile servicing device 150 or may be displayed on control device 130, or may be printed or sent by email, etc. The display may be generated on the basis of information in the servicing message. For example, the servicing message may include a lighting plan, e.g., a picture, coordinates of assets needing service, information regarding the service, etc.

For example, control computer 130, e.g., a lighting management system, uses the beacon identifiers received from lighting assets that need service to map the requesting asset in the light plan 70 as depicted exemplarily in FIG. 6*a*. For example, control computer 130 may match beacon identifiers to the assets in the light plan, or a location function may be requested to convert the beacon identifiers to a location data, etc. Service personal gets the light plan with highlighted assets 71 to be serviced. Also shown are assets 72 that do not need immediate attention yet, but may need replacement in future. For example, using the current measurement, a LED may need immediate attention if current stopped flowing altogether (the LED is broken), but may need future replacement is current dropped below a threshold, though not all the way to 0.

In an embodiment the assets which are near end of life 72 are marked in the servicing message. This allows, e.g. a service company, to decide to change them when their personal is near anyhow. In an embodiment, the location of assets in the vicinity of the building automation device that initiated the service request are marked dependent on their expected next service date. For example, a color scale from green to red may be used to indicate a remaining service time of, say, 30 to 1 day for each asset. That allows the service company to decide whether to change them when their personal is already operating in the vicinity.

In this particular example, the parts needed to execute the repairs are listed at 83. For example, the list includes assets which need to be exchanged and/or the parts which need be exchanged. Counters indicate how many assets need service. For example, as is shown 1 asset needs immediate attention (see reference 81), and 25 need attention though not immediate attention (see reference 82). An automated or partly automated order service may be used by control computer 130 to complement the service call. In this example, the owner of the connected network is shown at 80.

In an embodiment, the servicing message comprises beacon identifiers received by a beacon receiver of the building automation device. The servicing message may also comprise received signal strength indications. Processor 156 of servicing device 150 is configured to compare the localizing beacon signals received by the beacon receiver of the servicing device with the beacon identifiers included in the servicing message, and display a signal on the display if a match has been found. For example, processor 156 may compute a difference measure between the beacon identifiers and corresponding signals strengths currently received by servicing device 150 and the beacon identifiers and corresponding signals strengths previously received by building automation device 120. As the difference measure decreases the servicing device is closer to the building automation device 120. For example, the difference measure may be displayed so that an operator of servicing device 150 has an indication of the distance to the device that needs service.

Figure 6B:
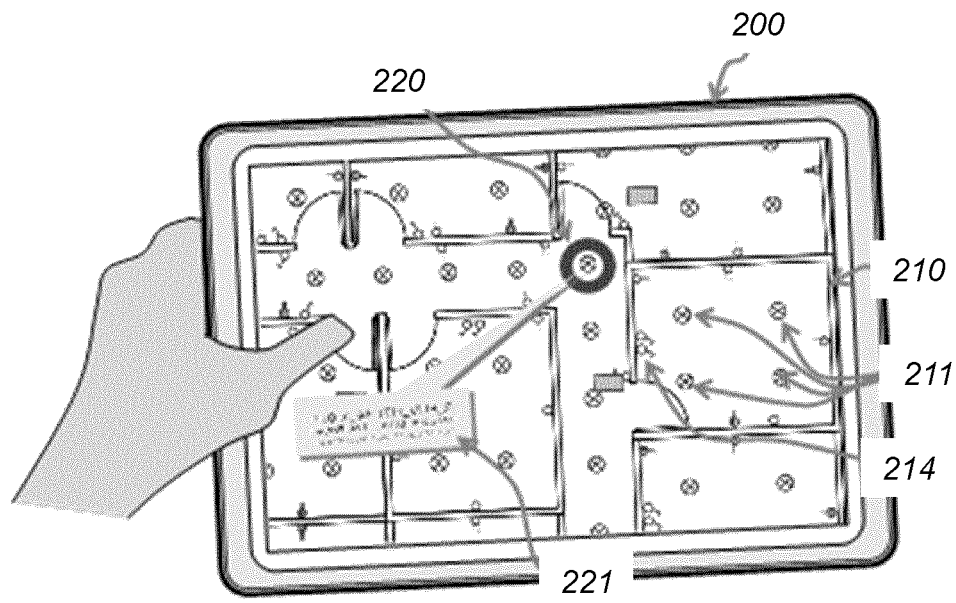
FIG. 6b schematically shows an example of an embodiment of a mobile servicing device, FIG. 6c schematically shows an example of an embodiment of a mobile servicing device, FIG. 7a schematically shows an example of an embodiment of a building automation method 300 for a building automation device, FIG. 7b schematically shows an example of an embodiment of a mobile servicing method 400, FIG. 7c schematically shows an example of an embodiment of a control method 600, FIG. 8a schematically shows a computer readable medium having a writable part comprising a computer program according to an embodiment, FIG. 8b schematically shows a representation of a processor system according to an embodiment.

FIG. 6*b* schematically shows an example of an embodiment of a mobile servicing device. The location of the building automation device is shown in a computer based servicing device as exemplarily depicted in FIG. 6*b* running on a tablet computer. Shown in FIG. 6*b* is the handheld computer device 200. The picture shown in the display is the building plan 210. The lighting devices are shown as there are light sources 211 and e.g. manual devices like switches 214. The service requesting asset 220 is clearly marked.

In a further developed embodiment additional Information about the requesting asset may be contained in an information note 221 which is displayed. The note may change depending on pointing actions on the screen.

Figure 6C:
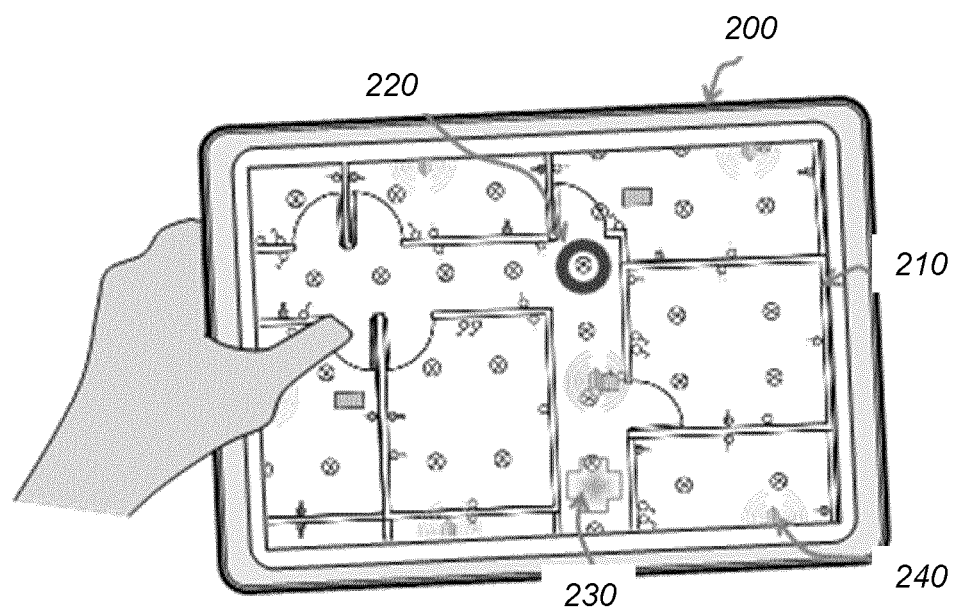

FIG. 6*c* schematically shows an example of an embodiment of a mobile servicing device. In this embodiment, the display on the servicing device shows the current position of the servicing device 230. For example, the servicing device may receive the beacons with a beacon receiver integrated with the handheld service tool. In embodiment the beacon transmitter positions 240 are also depicted in the light plan as indicated in FIG. 6*c*.

In an embodiment, the processor circuit of the building automation device is configured to repeatedly generate a localization message comprising the beacon identifiers stored in the beacon identifier memory and an identifier of the building automation device that identifies the building automation device within the one or more building automation devices. The localization message is repeatedly transmitted to control computer 130 over digital network 145.

Processor 134 is configured to store the localization message associated with the identifier of the building automation device. For example, processor 134 may comprise a database in which the localization messages are stored from some time. At some point, processor 134 may determine that no localization message has been received for an identifier of the building automation device in a time period. In this case, processor 134 has determined that this building automation device is in need of servicing, as it stopped sending localization messages. As in the case of receiving a service request, the processor may generate a servicing message comprising data localizing the building automation device, said data being obtained from the beacon identifiers in the last localization message, and transmit the servicing message to a mobile servicing device.

In an embodiment, the repetitive transmission of the localization messages may be e.g. once per day. The localization messages may be used to generate a display as shown in FIG. 4*b*. If control computer 130 does not receive the message from a certain lamp, the position of the malfunction device is known because of the messages received earlier. The system can e.g. compare the received lamp identifiers from one day with the list of identifiers of previous days. The difference, i.e. missing lamp identifiers indicate malfunction lamps.

In general, a communication interface may take various forms, such as a network interface to a local or wide area network, e.g., the Internet, etc. The communication interface may be wired or wireless etc.

Typically, the devices 110, 120, 130 and 150 each comprise a microprocessor (not separately shown) which executes appropriate software stored at the devices; for example, that software may have been downloaded and/or stored in a corresponding memory, e.g., a volatile memory such as RAM or a non-volatile memory such as Flash (not separately shown). Alternatively, the devices 110, 120, 130 and 150 may, in whole or in part, be implemented in programmable logic, e.g., as field-programmable gate array (FPGA). Devices 110, 120, 130 and 150 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

Figure 7A:
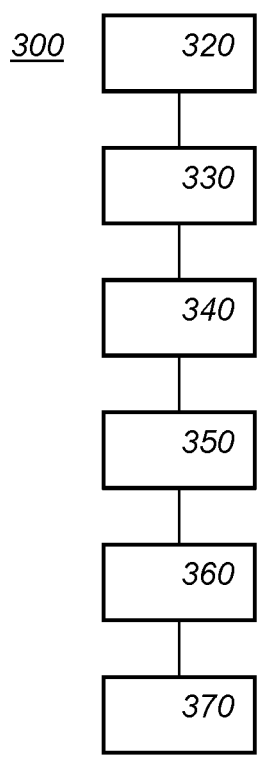

FIG. 7*a* schematically shows an example of an embodiment of a building automation method 300 for a building automation device. Method 300 comprising receiving 320 localizing beacon signals transmitted from multiple beacons installed in the vicinity of the one or more building automation devices, a localizing beacon signal comprising a beacon identifier identifying the beacon from which the localizing beacon signal originated, storing 330 beacon identifiers received by the beacon receiver, and monitoring 340 the building automation device, determining 350 a need for servicing of the building automation device, and if so, generating 360 a service request comprising the beacon identifiers stored in the beacon identifier memory, transmitting 370 the service request to the external control computer over the digital network.

Figure 7B:
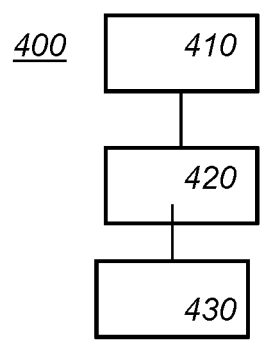

FIG. 7b schematically shows an example of an embodiment of a mobile servicing method 400. Method 400 comprising communicating 410 with a control computer over a digital network, and receiving a servicing message comprising data localizing a building automation device, receiving 420 localizing beacon signals transmitted from multiple beacons installed in the vicinity of the one or more building automation devices, a localizing beacon signal comprising a beacon identifier identifying the beacon from which the localizing beacon signal originated, obtaining 430 a localization of the building automation device from the data localizing the building automation device relative to a current position of the servicing device using the beacon receiver of the servicing device.

Figure 7C:
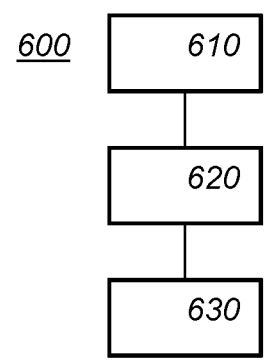

FIG. 7c schematically shows an example of an embodiment of a control method 600. Method 600 comprises communicating 610 with one or more electronic building automation devices over a digital network, and receiving a service request comprising beacon identifiers from a building automation device, and generating 620 a servicing message comprising data localizing the building automation device, said data being obtained from the beacon identifiers in the received service request, and transmitting 630 the servicing message to a mobile servicing device.

Many different ways of executing the methods are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform methods 300, 400 or 600. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bit stream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 8A:
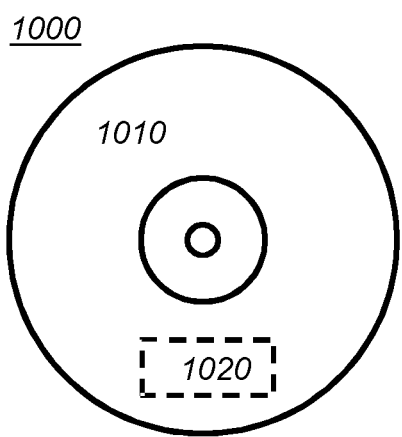

FIG. 8a shows a computer readable medium 1000 having a writable part 1010 comprising a computer program 1020, the computer program 1020 comprising instructions for causing a processor system to perform method 300, 400 or 600, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

Figure 8B:
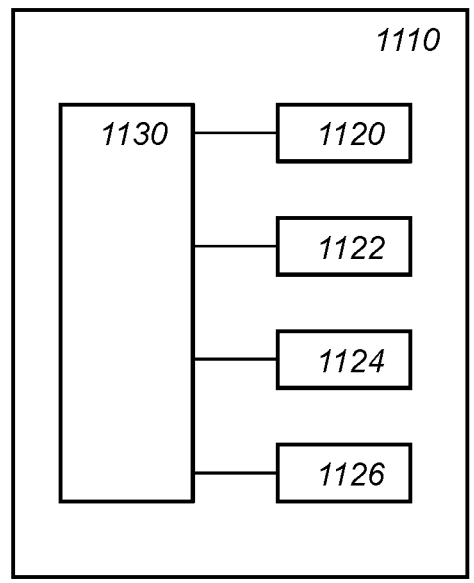

FIG. 8b shows in a schematic representation of a processor system 1140 according to an embodiment. The processor system comprises one or more integrated circuits 1110. The architecture of the one or more integrated circuits 1110 is schematically shown in FIG. 8b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the building automation device, control computer, servicing device, and beacon may comprise a processor circuit and a memory circuit, the processor being arranged to execute software stored in the memory circuit. For example, the processor circuit may be an Intel Core i7 processor, ARM Cortex-R8, etc. The beacon may comprise a ARM M0 Cortex. The memory circuit may be an ROM circuit, or a non-volatile memory, e.g., a flash memory. The memory circuit may be a volatile memory, e.g., an SRAM memory. In the latter case, the verification device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. An electronic building automation system, comprising:
one or more electronic building automation devices, comprising:
a communication interface arranged to communicate with an external control computer over a digital network,
a beacon receiver arranged to receive localizing beacon signals transmitted from multiple beacons installed in the vicinity of the one or more building automation devices, a localizing beacon signal comprising a beacon identifier identifying the beacon from which the localizing beacon signal originated,
a beacon identifier memory for storing beacon identifiers received by the beacon receiver, and
a processor circuit configured to:
monitor the building automation device,
determine a need for servicing of the building automation device, and if so,
generate a service request comprising the beacon identifiers stored in the beacon identifier memory,
transmit the service request to the external control computer over the digital network, and
the control computer comprising:
a communication interface arranged to communicate with the one or more electronic building automation devices over a digital network, and receive a service request comprising beacon identifiers from a building automation device, and
a processor circuit configured to:
generate a servicing message comprising data localizing the building automation device, said data being obtained from the beacon identifiers in the received service request.

2. An electronic building automation system as in claim 1, wherein:
a processor circuit is configured to:
transmit the servicing message to a mobile servicing device the system comprising:
the mobile servicing device comprising:
a communication interface arranged to communicate with the control computer over a digital network, and arranged to receive a servicing message comprising data localizing the building automation device,
a beacon receiver arranged to receive localizing beacon signals transmitted from multiple beacons installed in the vicinity of the one or more building automation devices, a localizing beacon signal comprising a beacon identifier identifying the beacon from which the localizing beacon signal originated,
a processor circuit configured to:
obtain a localization of the building automation device from the data localizing the building automation device relative to a current position of the servicing device using the beacon receiver of the servicing device.

3. An electronic building automation device for use in the system according to claim 1, comprising:
a communication interface arranged to communicate with an external control computer over a digital network,
a beacon receiver arranged to receive localizing beacon signals transmitted from multiple beacons installed in the vicinity of the one or more building automation devices, a localizing beacon signal comprising a beacon identifier identifying the beacon from which the localizing beacon signal originated,
a beacon identifier memory for storing beacon identifiers received by the beacon receiver, and
a processor circuit configured to:
monitor the building automation device,
determine a need for servicing of the building automation device, and if so,
generate a service request on the basis of said determined need for servicing, the service request comprising the beacon identifiers stored in the beacon identifier memory, and
transmit the service request to the external control computer over the digital network.

4. An electronic building automation device according to claim 3, wherein the processor circuit is configured to determine a need for servicing based on:
measuring an electric current through a component of the building automation device, and/or
measuring an electric voltage across a component of the building automation device, and/or
on the intensity of use of the building automation device.

5. An electronic building automation device according to claim 3, wherein the building automation device is a luminaire, or wherein the building automation device is any one of the following group: a heating device, a ventilation device, an air conditioning device, a speaker, an automated air valve, a fire detector, an occupancy sensor, a day light sensor, a wall switch.

6. An electronic building automation device according to claim 3, wherein:
the building automation device comprises a current measuring unit arranged to determine electric current flowing through a component of the building automation device, the processor of the building automation device being configured to determine a need for servicing when the building automation device is in an on-state and current measured by the current measuring unit is below a threshold, and/or
the building automation device comprises a voltage measuring unit arranged to determine electric voltage across a component of the building automation device, the processor of the building automation device being configured to determine a need for servicing when the building automation device is in an on-state and a voltage measured by the voltage measuring unit is above a threshold, and/or
the building automation device comprises a counter, the processor of the building automation device being configured to increase the counter in dependence on use of the building automation device, and determine a need for servicing when the counter reaches a threshold.

7. A mobile servicing device comprising:
a communication interface arranged to communicate with a control computer over a digital network, and arranged to receive a servicing message comprising data localizing a building automation device,
a beacon receiver arranged to receive localizing beacon signals transmitted from multiple beacons installed in the vicinity of the one or more building automation devices, a localizing beacon signal comprising a beacon identifier identifying the beacon from which the localizing beacon signal originated, a processor circuit configured to:
obtain a localization of the building automation device from the data localizing the building automation device relative to a current position of the servicing device using the beacon receiver of the servicing device, and wherein the servicing message further comprises beacon identifiers received by a beacon receiver of the building automation device, the mobile servicing device comprises a display, the processor circuit being configured to:
compare the localizing beacon signals received by the beacon receiver of the servicing device with the beacon identifiers included in the servicing message, and display a signal on the display if a match has been found.

8. A control computer comprising
a communication interface arranged to communicate with one or more electronic building automation devices over a digital network, and receive a service request comprising beacon identifiers from a building automation device, and
a processor circuit configured to:
generate a servicing message comprising data localizing the building automation device, said data being obtained from the beacon identifiers in the received service request,
transmit the servicing message to a mobile servicing device,
store a localization message associated with a beacon identifier of the building automation device,
determine that no localization message has been received for an identifier of the building automation device in a time period,
generate a servicing message comprising data localizing the building automation device, said data being obtained from the beacon identifiers in the last localization message, and
transmit the servicing message to the mobile servicing device.

9. A building automation device according to claim 1, wherein:
the processor of the building automation device is configured to:
repeatedly generate a localization message comprising the beacon identifiers stored in the beacon identifier memory and an identifier of the building automation device that identifies the building automation device within the one or more building automation devices, and transmit the message to the external control computer over the digital network.

10. A building automation method for a building automation device according to claim 3, comprising:
communicating with an external control computer over a digital network,
receiving localizing beacon signals transmitted from multiple beacons installed in the vicinity of the one or more building automation devices, a localizing beacon signal comprising a beacon identifier identifying the beacon from which the localizing beacon signal originated,
storing beacon identifiers received by the beacon receiver, and
monitoring the building automation device,
determining a need for servicing of the building automation device, and if so,
generating a service request on the basis of said determined need for servicing, the service request comprising the beacon identifiers stored in the beacon identifier memory, and
transmitting the service request to the external control computer over the digital network.

11. A mobile servicing method comprising:
communicating, by a communication interface of a mobile servicing device, with a control computer over a digital network,
receiving, by the communication interface of the mobile servicing device, a servicing message comprising data localizing a building automation device,
receiving, by a beacon receiver of the mobile servicing device, localizing beacon signals transmitted from multiple beacons installed in the vicinity of one or more building automation devices, a localizing beacon signal comprising a beacon identifier identifying the beacon from which the localizing beacon signal originated, and
obtaining, by a processor circuit of the mobile servicing device, a localization of the building automation device from the data localizing the building automation device relative to a current position of the servicing device using the beacon receiver of the servicing device.

12. A control method comprising:
communicating with one or more electronic building automation devices over a digital network,
receiving a service request comprising beacon identifiers from a building automation device,
generating a servicing message comprising data localizing the building automation device, said data being obtained from the beacon identifiers in the received service request,
transmitting the servicing message to a mobile servicing device,
storing a localization message associated with the beacon identifier of the building automation device,
determining that no localization message has been received for an identifier of the building automation device in a time period,
generating a servicing message comprising data localizing the building automation device, said data being obtained from the beacon identifiers in the last localization message, and
transmitting the servicing message to a mobile servicing device.

13. A non-transitory computer readable medium comprising data representing instructions to cause a processor system to perform the method according to claim 10.

* * * * *